United States Patent [19]

Nolte

[11] Patent Number: 4,626,301
[45] Date of Patent: Dec. 2, 1986

[54] METHOD OF MAKING A FIRE-RESISTANT TRANSLUCENT LAYER

[75] Inventor: Hans-Henning Nolte, Gelsenkirchen, Fed. Rep. of Germany

[73] Assignee: Flachglas Aktiengesellschaft, Furth, Fed. Rep. of Germany

[21] Appl. No.: 742,367

[22] Filed: Jun. 7, 1985

Related U.S. Application Data

[63] Continuation of Ser. No. 515,923, Jul. 20, 1983, abandoned.

[30] Foreign Application Priority Data

Jul. 20, 1982 [DE] Fed. Rep. of Germany ....... 3227057

[51] Int. Cl.⁴ .............................................. B32B 17/00
[52] U.S. Cl. .......................................... 156/99; 34/22; 34/27; 52/232; 156/325; 252/372; 264/85; 427/377; 427/397.8; 428/428; 428/920; 428/921

[58] Field of Search ..................... 156/99, 325; 264/85; 427/377, 397.8; 34/22, 27; 52/232; 428/428, 921, 920; 252/372

[56] References Cited

U.S. PATENT DOCUMENTS

| | | | |
|---|---|---|---|
| 4,173,668 | 11/1979 | Hentzelt et al. | 156/99 |
| 4,190,698 | 2/1980 | De Boel et al. | 428/428 |
| 4,191,805 | 3/1980 | Nolte | 428/921 |
| 4,304,052 | 12/1981 | Nolte et al. | 428/921 |

*Primary Examiner*—John J. Gallagher
*Attorney, Agent, or Firm*—Karl F. Ross; Herbert Dubno

[57] ABSTRACT

A nonflammable layer is made by drying an aqueous alkali metal silicate composition on a substrate in the presence of a drying atmosphere containing at least 30% free oxygen by volume so that the resulting layer remains bubble-free on aging even under intense ultraviolet radiation.

6 Claims, 2 Drawing Figures

METHOD OF MAKING A FIRE-RESISTANT TRANSLUCENT LAYER

This is a continuation of co-pending application Ser. No. 515,923 filed on July 20, 1983, now abandoned.

FIELD OF THE INVENTION

My present invention relates to a method of making a translucent solid flame-resistant layer and, more particularly, to a method of making a solid layer which is fireproof or flame retardant, and which can be provided in the form of a self-supporting plate or slab, or as a layer of a laminated structure capable of contributing flame-barrier properties to such structures.

BACKGROUND OF THE INVENTION

Flame-retardant layers which are translucent, i.e. light transmissive, have been provided heretofore and can be generated from hydrated alkali metal silicate compositions which can contain auxiliary agents and are heated in a drying atmosphere and dried to the solid layer. Such layers also can be considered to consist of expandable material because of a tendency toward bubble formation therein.

The auxiliary materials which can be utilized in such aqueous compositions include urea, polyhydric alcohols, monosaccharides, polysaccharides, sodium phosphate, sodium aluminate, aluminum phosphate, borax, boric acid and colloidal silica.

Such layers have been provided in the form of self-supporting plates or slabs, and also can be used as layers between glass panes so that the laminated structure, i.e. a sandwich construction of the panes and the flame-resistant layer, can constitute a fire-barrier wall or a portion of a fire barrier.

The solid flame resistant layer can also be provided as a foil, e.g. upon a glass pane serving as a substrate and can remain thereon when the assembly is built into a fire-barrier wall, or can be removed from the substrate to be utilized as a flame-retardant foil as desired. The drying is usually carried out in a drying chamber.

In the method described in German patent document (open application) DE-OS No. 28 33 718, the drying atmosphere is ambient air. The flame resistant layers formed by this method have been found to manifest, as early as the drying stage and as well thereafter, various changes which can be considered as "aging" and which appear to be the effect of light and heat and especially ultraviolet radiation. Microbubbles and larger bubbles in the expanded product appear to be generated in a form which interferes with the optical properties of the layer and even with the most careful drying, crack formation is observed.

To minimize these effects, the aforementioned auxiliary changes have been admixed with the hydrated alkali metal silicate (see the aforementioned German patent publication). Nonetheless aging-dependent bubble formations and deterioration of the optical properties is observed.

OBJECT OF THE INVENTION

It is the principal object of the present invention to provide a process for or a method of making such flame-resistant translucent layers such that the deterioration of the optical properties is eliminated or reduced and crack formation can be avoided with minimum age-dependent bubble formation even under high intensity ultraviolet radiation.

Another object of this invention thus is the provision of a method of making such a layer which has longer useful life and is free from the tendency toward premature aging characterizing prior art systems as described.

SUMMARY OF THE INVENTION

I have found, most surprisingly, that these results can be attained utilizing a method in which the composition is dried from the aqueous solution in a drying atmosphere containing at least 30% by volume free oxygen.

The term "free oxygen" as used herein means $O_2$ and, while I prefer to operate with an atmosphere consisting of free oxygen and the unavoidable impurities in commercially available technical grade purity oxygen, it should be noted that there is little or no advantage in operating in high purity or pure oxygen. Preferably, apart from oxygen, the drying atmosphere can also contain steam.

This has practical advantages. For example, in a preferred mode of carrying out the present invention, a drying chamber in which the drying operation is to be carried out is initially heated to a temperature of 100° C. or more and the air in this chamber is displaced by steam and thereafter technical-grade purity oxygen is introduced. Unless indicated otherwise, whereever reference is made to oxygen hereinafter technical-grade purity oxygen will be understood to be intended.

According to another feature of the invention, the oxygen containing drying atmosphere can include a maximum of 15 volume percent of a gas selected from the group which consists of argon, nitrogen and sulfur hexafluoride or mixtures thereof.

In a best mode embodiment of this invention, the drying atmosphere consists of 40 volume percent oxygen, 15 volume percent nitrogen and about 45 volume percent steam, any remainder representing customary impurities which may be present in the various gases, e.g. inert gases in the oxygen.

Of course, other combinations within the parameters presented earlier can be utilized. For example, the gas mixture can contain the minimum of 30 volume percent oxygen and a maximum of 70 volume percent helium or another gas whose atom or molecule is more mobile in the alkali metal silicate layer than the steam molecule.

Surprising results are obtained with the system of the invention. For example, during the fabrication of the flame-barrier layer, bubble formation does not appear to occur and hence bubble formation is not introduced during the drying or upon aging. Crack formation is also not observed.

These results are indeed surprising since it is the prevalent belief (see German open application—Offenlegungsschrift DE-OS No. 30 12 969) that oxygen should be kept away from the layer at least during part of the drying process and, during part of the drying process, one or more gases should be contacted with the layer which are less soluble therein than oxygen. While all of these approaches have been found to be unsatisfactory, the invention provides reproduceable products with an exceptionally high degree of resistance to aging.

According to a feature of the invention, water vapor removed from the layer to be dried during the drying operation, can be eliminated from the drying atmosphere. For example, during the drying, the drying atmosphere can be circulated and the excess water taken up in the manner described, can be removed from the circulating gas.

The drying can be carried out in a system provided with a semipermeable membrane e.g. in air connected to the drying chamber, which is permeable to water vapor but not permeable to the oxygen or the other gases admixed therewith. In the simplest case, the drying chamber can be a drying hood.

While I can operate with auxiliary substances admixed with the alkali silicate solution in the manner described previously, one of the surprising and important advantages of the invention is that it can be carried out effectively without the addition of glycerine to the mixture. In general, the composition is coated upon the glass pane serving as the substrate, and is dried and covered with another glass pane. After the drying it does not appear to matter that the flame-resistant layer is contacted with ambient air or with the moisture contained therein.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
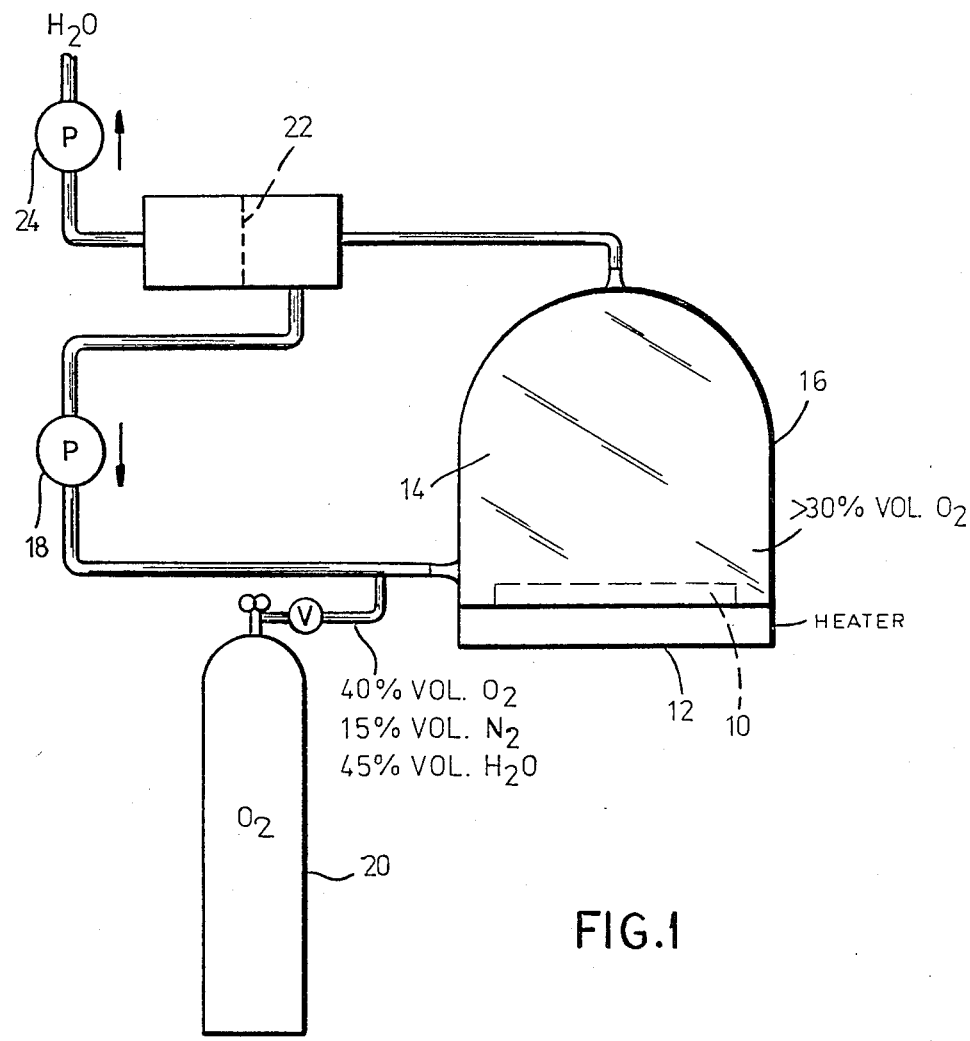
FIG. 1 is a diagram of an apparatus for carrying out the method of the invention.

In FIG. 1 I have shown an apparatus which can be used to carry out the method of the invention. In this method, a glass substrate, coated with an aqueous composition of hydrated alkali metal silicate, with or without additives in the manner described, is represented at 10 and can be placed upon a heating plate 12 which can be utilized to bring the chamber 14 within a hood 16 to a temperature of about 100° C.

The drying atmosphere is circulated by the pump or blower represented at 18 and to bring this atmosphere to an oxygen concentration of at least 30% by volume, oxygen is fed to the circulated atmosphere from the tank 20. While, as shown, a high concentration of water vapor is permissible and indeed desirable in this atmosphere, the drying operation tends to build up water vapor in the recirculated drying atmosphere and the excess water vapor is extracted by passing the atmosphere into contact with a semipermeable membrane 22, the other side of which is evacuated by a suction pump 24 so that excess water vapor is drawn through the membrane which is permeable to water vapor but not to the oxygen and other gaseous constituents of the circulated atmosphere.

Figure 2:
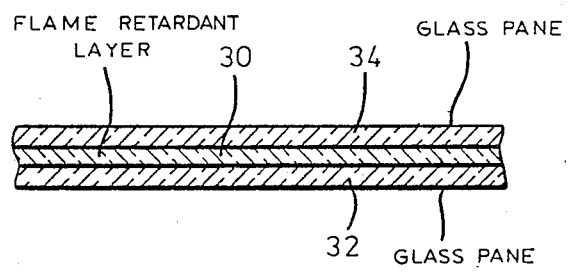
FIG. 2 is a diagrammatic cross section through the product thereof.

After the fireproof layer 30 has been dried into solid form on the substrate represented by the glass pane 32, another glass pane 34 can be applied and bonded thereto in a conventional manner. The sandwich structure shown in FIG. 2 represents a highly effective fire barrier in a window of a fire wall which is both translucent and transparent, and does not appear to age to the detriment of light transmissivity even under intensive ultraviolet irradiation.

SPECIFIC EXAMPLES

EXAMPLE 1

Drying is carried out in oxygen steam (4 liters per minute) with a drying temperature of 80° C. The glass pane having an area of about 0.32 $m^2$ is coated with 33.7 liters of water glass per $m^2$, without other additives and this layer is dried over a period of about 15 hours. The resulting fire-resistant and nonflammable layer is highly smooth and free from bubbles. After the composite is formed, it is subjected to aging at 95° C. under strong ultraviolet radiation and unlike the products of conventional drying, the layer does not show any bubble formation.

EXAMPLE 2

Drying is carried out under a semipermeable hood filled with oxygen at a temperature of 80° C. after 3.7 liters of water glass mixed with glycerine/$m^2$ is applied over an area of 0.33 $m^2$ to the glass pane substrate. The glycerine content was about 5% by volume. The drying was effected for 40 hours and excess moisture was removed through the semipermeable hood. The resulting layer was extremely smooth and free from bubbles and aging tests at high temperature showed no bubble formation.

Similar results are obtained when nitrogen and helium are added to the drying atmosphere as long as the oxygen content is held above 40% by volume.

I claim:

1. A method of making a flame-resistant layer which comprises the steps of:
    depositing an aqueous composition of an alkali metal silicate upon a substrate; and
    drying said composition on said substrate in a drying atmosphere consisting essentially of oxygen with an oxygen content maintained at at least 30% by volume free oxygen, a maximum of 15% by volume of gases selected from the group which consists of argon, nitrogen and sulfur hexafluoride, and the balance a gas selected from the group which consists of water vapor and helium.

2. The method defined in claim 1 wherein said drying atmosphere consists of substantially 40 volume percent oxygen, 15 volume percent nitrogen and 45 volume percent water vapor.

3. The method defined in claim 1 wherein said drying atmosphere contains up to 70 volume percent helium.

4. The method defined in claim 1 wherein said drying atmosphere is circulated and excess water is removed from the drying atmosphere during the circulation thereof.

5. The method defined in claim 1 wherein the drying is carried out in a drying chamber provided with a semipermeable membrane permeable to water vapor but not to oxygen and other gaseous constituents of said atmosphere and during the drying water vapor liberated by the drying is removed from the atmosphere.

6. The method defined in claim 1 wherein said substrate is a glass pane, further comprising the step of covering said layer after the drying thereof with a second glass pane.

* * * * *